(12) United States Patent
Liu et al.

(10) Patent No.: US 8,393,776 B2
(45) Date of Patent: Mar. 12, 2013

(54) BACK LIGHT MODULE

(75) Inventors: Huang-Chun Liu, Taoyuan (TW);
Chung-Lin Tsai, Taoyuan (TW);
Sheng-Ju Chung, Taoyuan (TW)

(73) Assignee: Global Lighting Technologies, Inc., Taoyuan (TW)

( * ) Notice: Subject to any disclaimer, the term of this patent is extended or adjusted under 35 U.S.C. 154(b) by 331 days.

(21) Appl. No.: 12/980,411

(22) Filed: Dec. 29, 2010

(65) Prior Publication Data
US 2011/0157918 A1  Jun. 30, 2011

(30) Foreign Application Priority Data
Dec. 30, 2009  (TW) ................................ 98145893 A

(51) Int. Cl.
*F21V 8/00* (2006.01)
*G02F 1/13357* (2006.01)

(52) U.S. Cl. ....... 362/615; 362/612; 362/613; 362/97.2; 362/97.3

(58) Field of Classification Search .................. 362/612, 362/613, 97.2, 97.3, 616, 625
See application file for complete search history.

(56) References Cited

U.S. PATENT DOCUMENTS

| | | | | |
|---|---|---|---|---|
| 7,566,143 B2* | 7/2009 | Furukawa et al. | ............ | 362/231 |
| 7,780,306 B2* | 8/2010 | Hoshi | .......................... | 362/97.1 |
| 8,246,187 B2* | 8/2012 | Cheong et al. | ............... | 362/97.1 |
| 2011/0096568 A1* | 4/2011 | Schattinger et al. | .......... | 362/613 |

* cited by examiner

*Primary Examiner* — Stephen F Husar
*Assistant Examiner* — James Cranson, Jr.
(74) *Attorney, Agent, or Firm* — Chun-Ming Shih; HDLS IPR Services

(57) ABSTRACT

A backlight module is provided in the present invention. The backlight module includes a light guide plate, a light source plate and a plurality of side-view lighting elements. The light guide plate comprises a light guide body being an integrally-formed single plate body and comprising a plurality of elongated grooves and a plurality of penetrated grooves. The penetrated grooves and the elongated grooves are collectively arranged on a surface of the light guide plate to separate the light guide plate into a plurality of light emitting regions. The side-view lighting elements arranged on the light source plate are attached to a side of the light guide body and respectively disposed for the penetrated grooves to illuminate corresponding light emitting regions.

20 Claims, 3 Drawing Sheets

BACK LIGHT MODULE

BACKGROUND OF THE INVENTION

1. Field of the Invention

The present invention relates to a backlight module which is used in a display, and in particular to a backlight module which is used in a liquid crystal display.

2. Description of Prior Art

Recently, liquid crystal displays (LCDs) are luminesced by adopting planar light sources, such as external electrode fluorescent lamps (EEELs) or cold cathode fluorescent lamps (CCFLs), where the backlight source can completely turn-on or turn-off the EEELs or CCFLs to light all regions of the backlight source. However, the planar light sources can not provide different luminance levels in particular regions.

In order to solve the problem, a local dimming technology of the backlight source has been developed to supply light with partially adjusted brightness to the LCDs, which has advantages of lower power consumption, increased display contract ratio, higher gray scale numbers and reduced dynamic image blur.

For example, while a backlight source supplying for an LCD using 12 CCFLs as a light source, the backlight source controls just the luminance levels corresponding to 12 regions on which the CCFLs located. Moreover, over-frequent turn-on and turn-off rate of the CCFLs will decrease the life-time due to the limited turn-on and turn-off rate of the CCFLs.

On the other hand, a light guide plate is used for a backlight module supplying for a general LCD. The LCD employing the local dimming technology generates light with brightness value adjusted by the light guide plate in order to particularly supply the light to the LCDs. However, the light generated from the backlight source may be guided by the light guide plate to another region adjacent this region, thus reducing the contract ratio of luminance.

Moreover, since the backlight source employing the local dimming technology is composed of a plurality of light guide plates to satisfy the requirement of size or shape of the LCDs, there are caused problem of bright lines (luminescent lines) resulted from seams between the light guide plates, and the contract ratio of luminance may be reduced.

SUMMARY OF THE INVENTION

In order to solve the above-mentioned problem, a backlight module of a display employing the local dimming technology are disclosed for enhancing contract ratio of luminance in particular regions.

The backlight module includes a light guide plate, a light source plate and a plurality of side-view lighting elements. The light guide plate includes a light guide body being an integrally-formed single plate body and comprising a plurality of elongated grooves and a plurality of penetrated grooves. The elongated grooves and the penetrated grooves are separate the light guide body into a plurality of light emitting regions. The independent-controllable side-view lighting elements arranged on the light source plate are attached to one side of the light guide body and disposed for the penetrated grooves, respectively, to illuminate laterally toward corresponding light emitting regions.

According to a preferred embodiment of the invention, the light emitting regions are equidistantly arranged on a surface of the single plate body in array.

According to a preferred embodiment of the invention, the elongated grooves and the penetrated grooves are respectively arranged on a surface of the single plate body in array, and the arranged direction of each penetrated groove is perpendicular to the arranged direction of each elongated groove.

According to a preferred embodiment of the invention, the width of each elongated groove is smaller than the width of each penetrated groove.

According to a preferred embodiment of the invention, the elongated grooves penetrate the single plate body.

According to a preferred embodiment of the invention, the elongated grooves do not penetrate the single plate body.

According to a preferred embodiment of the invention, the elongated grooves have V shape or U shape cross-section.

According to a preferred embodiment of the invention, an optical microstructure is disposed on at least one interior wall of each penetrated groove formed on the light guide body and faced a lighting surface of the side-view lighting element, and the optical microstructure has protruded-shape, indent-shape, spherical-shape or serrate shape.

According to a preferred embodiment of the invention, wherein a light blocking structure is disposed on at least one interior wall of each penetrated groove formed on the light guide body and faced one surface which is opposite to a lighting surface of the side-view lighting element, and the light blocking structure is a reflecting plate or a matted structure.

The present invention further provides a backlight module, comprising a light guide plate, a light source plate and a plurality of side-view lighting elements. The light guide plate comprises a light guide body composed of a plurality of plate bodies and having a plurality of elongated grooves and a plurality of penetrated grooves formed thereon. The elongated grooves and the penetrated grooves separating the light guide body into a plurality of light emitting regions. The light source plate is disposed on one side of the light guide body. The side-view lighting elements are arranged on the light source plate and respectively disposed for the penetrated grooves to illuminate the corresponding light emitting regions.

According to a preferred embodiment of the invention, the light emitting regions are equidistantly arranged on the plate bodies in array.

According to a preferred embodiment of the invention, the elongated grooves and the penetrated grooves are respectively arranged on a surface of the plate bodies in array, and the arranged direction of each penetrated groove is perpendicular to the arranged direction of each elongated groove.

According to a preferred embodiment of the invention, the width of each elongated groove is smaller than the width of each penetrated groove.

According to a preferred embodiment of the invention, the elongated grooves penetrate the plate bodies.

According to a preferred embodiment of the invention, the elongated grooves do not penetrate the plate bodies.

According to a preferred embodiment of the invention, the elongated grooves have V shape or U shape cross-section.

According to a preferred embodiment of the invention, an optical microstructure is disposed on at least one interior wall of each penetrated groove formed on the light guide body and faced a lighting surface of the side-view lighting element, and the optical microstructure has protruded-shape, indent-shape, spherical-shape or serrate shape.

According to a preferred embodiment of the invention, a light blocking structure is disposed on at least one interior wall of each penetrated groove formed on the light guide body and faced one surface which is opposite to a lighting surface of the side-view lighting element, and the light blocking structure is a reflecting plate or a matted structure.

According to a preferred embodiment of the invention, one of the plate bodies having a first joint part and the other one of the of the plate bodies having a second joint part, and the second joint part is matched with the first joint part for combining each other.

According to a preferred embodiment of the invention, a reflecting element is disposed between the first joint part and the second joint part.

Therefore, the backlight source employing the local dimming technology has the plurality light emitting regions which are separated by the penetrated grooves and the elongated grooves. When light is generated in each of the light emitting regions, the contract ratio reduction by adjacent light emitting region can be prevented.

BRIEF DESCRIPTION OF DRAWING

The features of the invention believed to be novel are set forth with particularity in the appended claims. The invention itself, however, may be best understood by reference to the following detailed description of the invention, which describes an exemplary embodiment of the invention, taken in conjunction with the accompanying drawings, in which:

DETAILED DESCRIPTION OF THE INVENTION

The present invention now will be described more fully hereinafter with reference to the accompanying drawings, in which embodiments of the invention are shown. However, it will be appreciated by those skilled in the art that alterations and modifications may be made in these embodiments without departing from the spirit and scope of the present invention.

Figure 1:
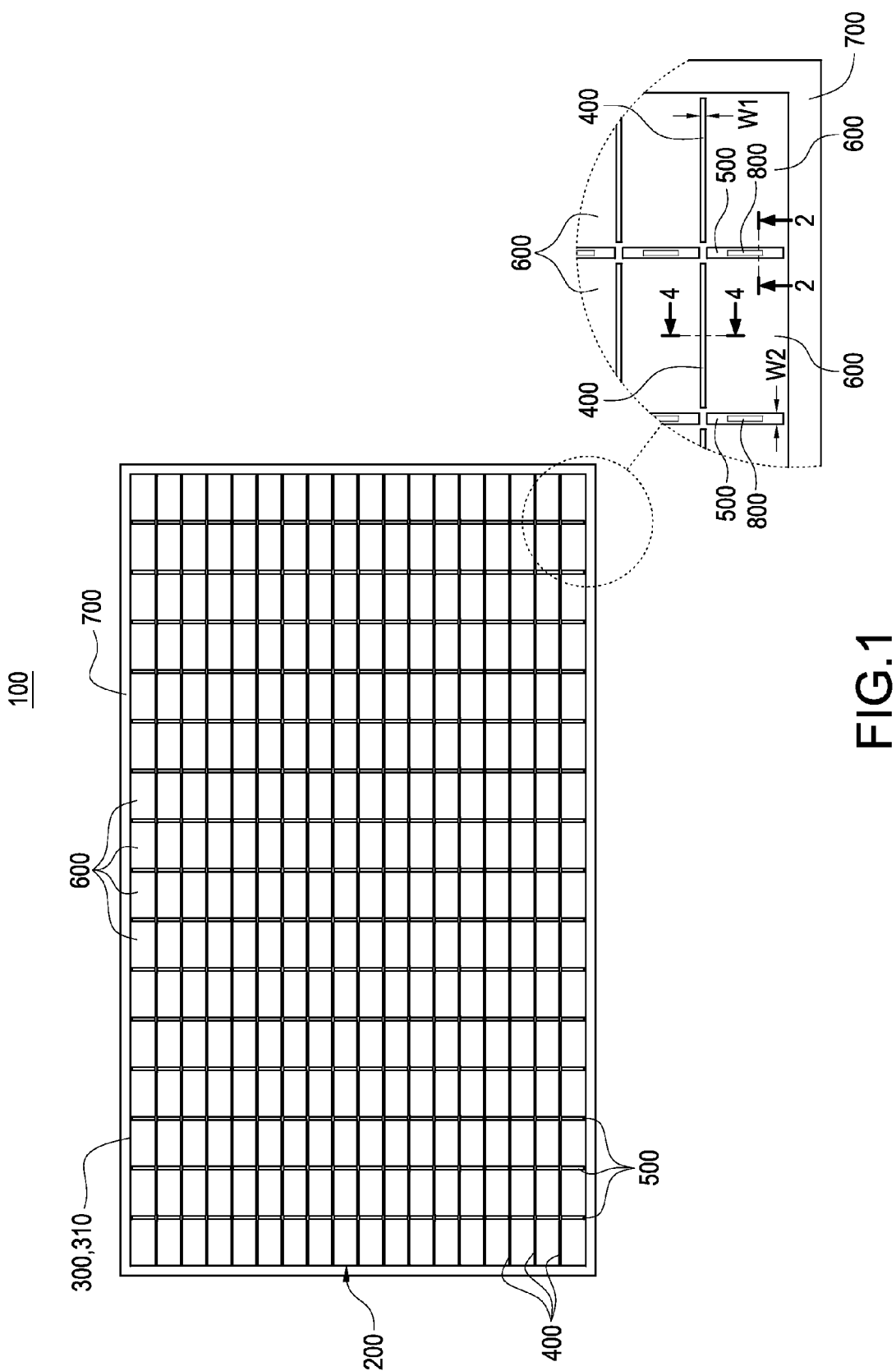
FIG. 1 is a top view and enlarged view of a light guide plate and a backlight module using the same according to a first embodiment of the present invention.
Figure 2:
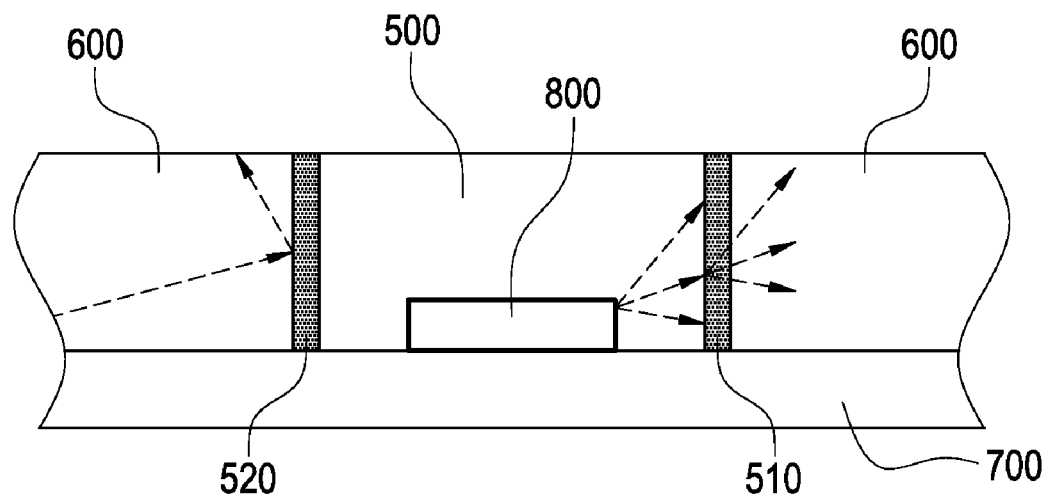
FIG. 2 is a cross-sectional view taken along line 2-2 of FIG. 1 illustrating the backlight module and shown the light propagation therein.

Referenced is made to FIG. 1, which is a top view and enlarged view according to a first embodiment of the present invention. The backlight module 100 includes a light guide plate 200 and a light source plate 700. The light guide plate 200 includes a light guide body 300, a plurality of elongated grooves 400 and a plurality of penetrated grooves 500. The elongated grooves 400 and the penetrated grooves 500 are respectively formed on the light guide body 300 to separate the light guide body 300 into a plurality of light emitting regions 600. The penetrated grooves 500 respectively penetrate through the light guide body 300 from one surface to another surface which is opposite thereto. In more particularly, the penetrated grooves 500 penetrate the light guide body 300 through its top surface to bottom surface (as shown in FIG. 2), thus the light emitting regions located at both sides of each of the penetrated grooves 500 are separated from each other. The light source plate 700 with a plurality of independent-controllable side-view lighting elements 800, such as side-view light emitting diodes (LEDs), is disposed on one side of the light guide body 300. The side-view lighting elements 800 are arranged on the light source plate 700 and disposed for the penetrated grooves 500, respectively, to illuminate laterally toward a corresponding lighting region 600. Moreover, the side-view lighting elements 800 may be adjusted the disposing level (namely, length from the top surface to the bottom surface of the light guide body 300) according to its optical character (such as light divergence angle or light intensity distribution) to illuminate the light guide body 300 for enhancing brightness of the backlight module 100.

The light generated from each side-view lighting element 800 which is disposed for the penetrated groove 500 is impinged to one of the light emitting regions 600 and emitting outward through the light emitting region 600.

The light emitting regions 600 which are separated by the elongated grooves 400 and the penetrated grooves 500 which have appropriate distances and spaces between each other can effectively prevent light inject into other light emitting regions 600 adjacent to this light emitting region 600.

Therefore, excellent light separation effect is provided at the light guide plate 200 by the elongated grooves 400 and the penetrated grooves 500. At the time, backlight source with the light guide plate 200 employing the local dimming technology, may enhance contract ratio of luminance of the light emitting region.

Referring to FIG. 1 again, in the first embodiment of the present invention, the elongated grooves 400 are formed on one surface of the light guide body 300 in array and the penetrated grooves 500 are formed on the same surface in another array. In more particularly, the arranged direction of each elongated groove 400 is perpendicular to the arranged direction of each penetrated groove 500, and an interval between each two of penetrated grooves 500 are overlapping to an interval between each two of elongated grooves 400. In actually, each of the elongated grooves 400 does not interlink to each of the penetrated grooves 500.

For example, the penetrated grooves 500 are formed longitudinally and evenly along the light guide body 300 from the surface in parallel, and the elongated grooves 400 are formed vertically and evenly along the light guide body 300 from the surface in parallel.

Therefore, the arranged direction of the penetrated grooves 500 are perpendicular to the arranged direction of the elongated grooves 400, and the light emitting regions 600 separated by the elongated grooves 400 and the penetrated grooves 500 can be a rectangle as one example to equidistantly arrange at the light guide body 300.

Referenced is made to FIG. 2, which is a cross-sectional view taken along line 2-2 of FIG. 1 illustrating the backlight module and shown the light propagation therein. In the other embodiment of the present invention, an optical microstructure 510 is disposed on at least one interior wall of each penetrated grooves 500, wherein the interior wall faces a lighting surface of the side-view lighting element 800. The optical microstructure 510 can be of protruded shape, indent shape, spherical shape or serrate shape, to refraction light generated from the side-view lighting elements 800.

Referring to FIG. 2 again, in the other embodiment of the invention, a light blocking structure 520 is disposed on at least one interior wall faced the opposite side of the lighting surface of the side-view lighting element 800. The light blocking structure 520 prevents light impinged into this light emitting region 600 from adjacent light emitting regions 600, and then enhances the contract ratio of luminance. The light blocking structure 520 may be a matted structure adopts matted processing or an independent reflecting plate for reflecting adjacent light.

Referring to FIG. 1 again, in the other embodiment of the invention, the surface of the light guide body 300 may be smooth or granular. However, the number of the light guide body 300 is not limited, and the light guide body 300 may be an integrally-formed body 310, for example.

Figure 3:
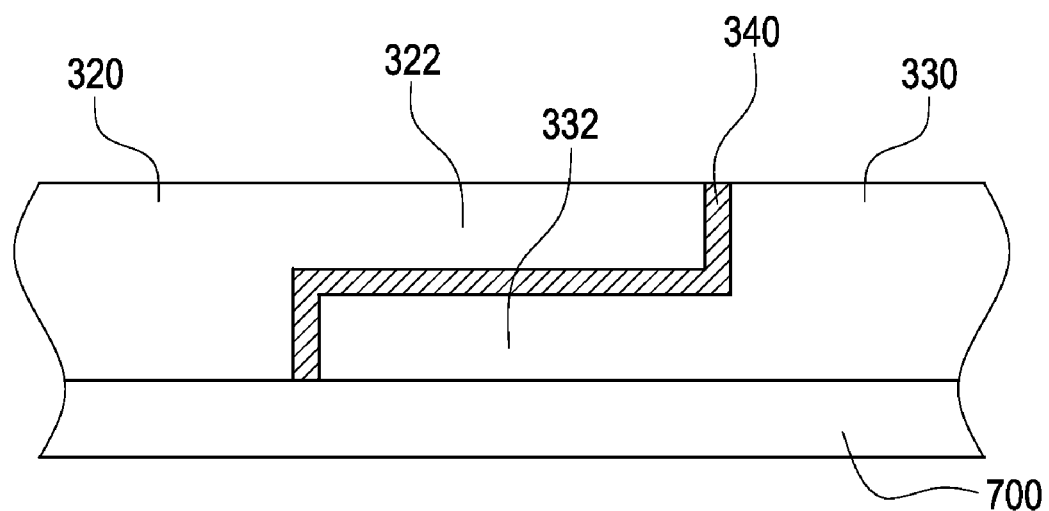
FIG. 3 is a cross-sectional view of a light guide plate and a backlight module using the same according to a second embodiment.

Referenced is made to FIG. 3, which is a cross sectional view of a light guide plate and a backlight module using the same according to a second preferred embodiment of the present invention. The light guide body 300 is composed of a plurality of plate bodies. For example, the light guide body 300 is composed of a first plate body 320 and a second plate body 330. The first plate body 320 includes a first joint part 322 and the second plate body 330 includes a second joint part 332. The second joint part 332 is matched with the first joint part 322 for combining each other. In the embodiment, a reflecting element 340 can be alternatively disposed between the first joint part 322 and the second joint part 332. Thus, the reflecting element 340 prevents bright lines (luminescent lines) resulted from the seams between the first plate body 320 and second plate body 330, and then enhances the luminous contract ratio of each light emitting regions 600.

It should be noted that the shape of each elongated groove 400 formed on the light guide body 300 is not particularly limited, but may be rectangle, ellipse or other polygon. However, in the practical application, the shape of each elongated groove 400 can be adjusted according to different situations by research and develop specialists.

Figure 4A:
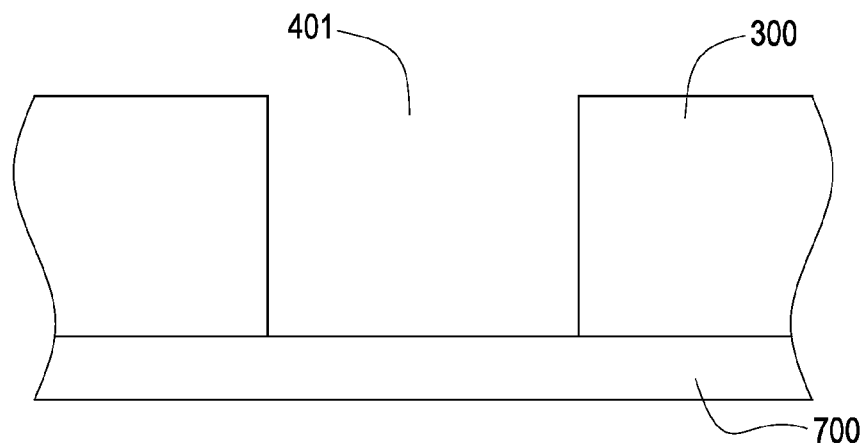
FIG. 4A is a first cross-sectional view taken along line 4-4 of FIG. 1 illustrating the backlight module.

The present invention is not limited to that the elongated grooves 400 penetrate through the light guide body 300 or not. Referenced is made to FIG. 4A, which is a first cross-sectional view taken along line 4-4 of FIG. 1 illustrating the backlight module. An elongated through groove 401 is resulted from the elongated groove 400 which penetrates the light guide body 300, thus the light impinged to each light emitting region 600 can be effectively and separated by the elongated through groove 401.

Figure 4B:
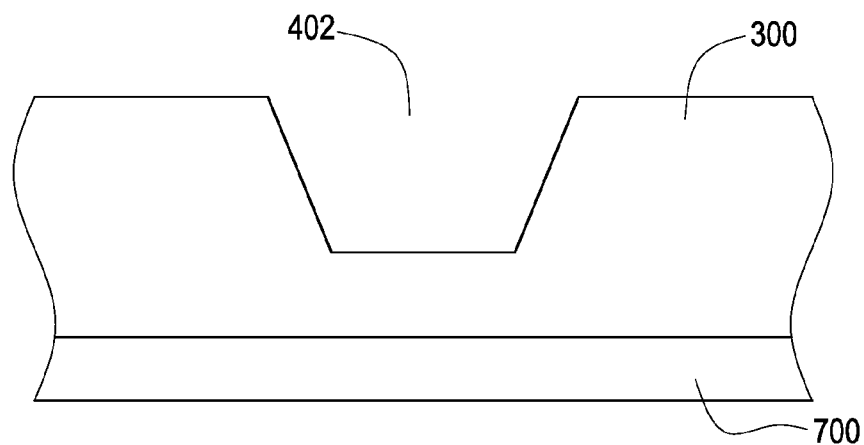
FIG. 4B is a second cross-sectional view taken along line 4-4 of FIG. 1 illustrating the backlight module.
Figure 4C:
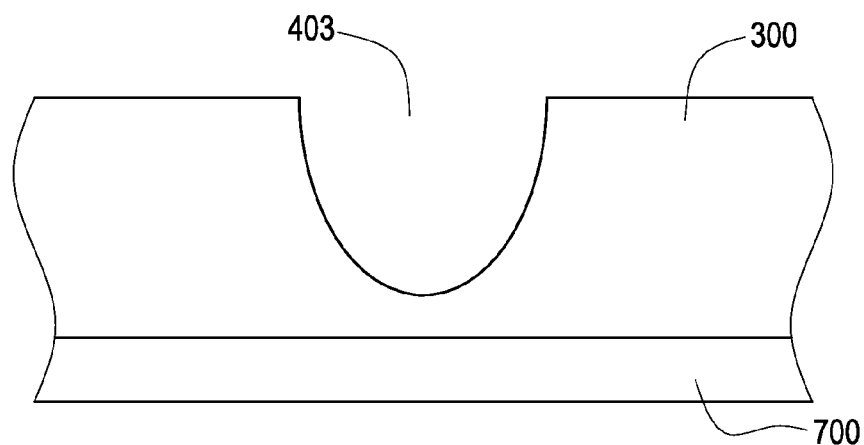
FIG. 4C is a third cross-sectional view taken along line 4-4 of FIG. 1 illustrating the backlight module.

Referenced is made to FIGS. 4B and 4C, which are the second and third cross-sectional views taken along line 4-4 of FIG. 1 illustrating the backlight module. The elongated grooves 400 in the embodiments do not penetrate the light guide plate 300, and the elongated grooves 400 may be V-shaped elongated grooves 402 with V-shaped cross-section (shown in FIG. 4B) or U-shaped elongated grooves 403 with U-shaped cross-section (shown in FIG. 4C). However, the cross-section of the elongated grooves are not limited, and research and develop specialists can adjust them based on different situations.

The present invention is not limited the shape of the penetrated grooves 500 formed on the light guide body 300, but the shape may substantially be rectangle (shown in FIG. 1), ellipse (not shown) or other polygon (not shown) for disposing the side-view lighting element 800. However, in the practical application, the shape of each elongated groove 400 can be adjusted according to different situations by research and develop specialists.

Referring to FIG. 1 again, the penetrated grooves 500 are provided for disposing the side-view lighting elements 800, thus the size of the penetrated grooves 500 depends on the operation condition of the side-view lighting elements 800, and is not limited thereto. Moreover, the elongated grooves 400 are not provided for disposing the side-view lighting element 800, thus the width W1 of the elongated grooves 400 is smaller than the width W2 of the penetrated grooves 400 to enlarge the lighting areas of the light emitting regions 600. However, in the practical application, the size of each elongated groove 400 can be adjusted according to different situations by research and develop specialists.

In conclusion, the backlight source employing the local dimming technology has the plurality light emitting regions which are separated by the penetrated grooves and the elongated grooves. When light is generated in each of the light emitting regions, the contract ratio reduction by adjacent light emitting region can be prevented.

Although the present invention has been described with reference to the foregoing preferred embodiment, it will be understood that the invention is not limited to the details thereof. Various equivalent variations and modifications can still occur to those skilled in the art in view of the teachings of the present invention. Thus, all such variations and equivalent modifications are also embraced within the scope of the invention as defined in the appended claims.

What is claimed is:

1. A backlight module, comprising:
   a light guide plate, comprising:
   a light guide body being an integrally-formed single plate body and comprising a plurality of elongated grooves and a plurality of penetrated grooves, wherein the elongated grooves and the penetrated grooves separate the light guide body into a plurality of light emitting regions;
   a light source plate attached to one side of the light guide plate; and
   a plurality of side-view lighting elements arranged on the light source plate and respectively disposed for the penetrated grooves to illuminate corresponding light emitting regions.

2. The backlight module in claim 1, wherein the light emitting regions are equidistantly arranged on a surface of the single plate body in array.

3. The backlight module in claim 1, wherein the elongated grooves and the penetrated grooves are respectively arranged on a surface of the single plate body in array, and the arranged direction of each penetrated groove is perpendicular to the arranged direction of each elongated groove.

4. The backlight module in claim 1, wherein the width of each elongated groove is smaller than the width of each penetrated groove.

5. The backlight module in claim 1, wherein the elongated grooves penetrate the single plate body.

6. The backlight module in claim 1, wherein the elongated grooves do not penetrate the single plate body.

7. The backlight module in claim 6, wherein the elongated grooves have V shape or U shape cross-section.

8. The backlight module in claim 1, wherein an optical microstructure is disposed on at least one interior wall of each penetrated groove formed on the light guide body and faced a lighting surface of the side-view lighting element, and the optical microstructure has protruded-shape, indent-shape, spherical-shape or serrate shape.

9. The backlight module in claim 1, wherein a light blocking structure is disposed on at least one interior wall of each penetrated groove formed on the light guide body and faced one surface which is opposite to a lighting surface of the side-view lighting element, and the light blocking structure is a reflecting plate or a matted structure.

10. A backlight module, comprising:
    a light guide plate, comprising:
    a light guide body composed of a plurality of plate bodies and having a plurality of elongated grooves and a plurality of penetrated grooves formed thereon, the elongated grooves and the penetrated grooves separating the light guide body into a plurality of light emitting regions;

a light source plate attached to one side of the light guide body; and a plurality of side-view lighting elements arranged on the light source plate and respectively disposed for the penetrated grooves to illuminate the corresponding light emitting regions.

11. The backlight module in claim 10, wherein the light emitting regions are equidistantly arranged on the plate bodies in array.

12. The backlight module in claim 10, wherein the elongated grooves and the penetrated grooves are respectively arranged on a surface of the plate bodies in array, and the arranged direction of each penetrated groove is perpendicular to the arranged direction of each elongated groove.

13. The backlight module in claim 10, wherein the width of each elongated groove is smaller than the width of each penetrated groove.

14. The backlight module in claim 10, wherein the elongated grooves penetrate the plate bodies.

15. The backlight module in claim 10, wherein the elongated grooves do not penetrate the plate bodies.

16. The backlight module in claim 15, wherein the elongated grooves have V shape or U shape cross-section.

17. The backlight module in claim 10, wherein an optical microstructure is disposed on at least one interior wall of each penetrated groove formed on the light guide body and faced a lighting surface of the side-view lighting element, and the optical microstructure has protruded-shape, indent-shape, spherical-shape or serrate shape.

18. The backlight module in claim 10, wherein a light blocking structure is disposed on at least one interior wall of each penetrated groove formed on the light guide body and faced one surface which is opposite to a lighting surface of the side-view lighting element, and the light blocking structure is a reflecting plate or a matted structure.

19. The backlight module in claim 10, wherein one of the plate bodies having a first joint part and the other one of the of the plate bodies having a second joint part, and the second joint part is matched with the first joint part for combining each other.

20. The backlight module in claim 19, wherein a reflecting element is disposed between the first joint part and the second joint part.

* * * * *